United States Patent [19]

Ter Meulen

[11] Patent Number: 5,230,796

[45] Date of Patent: Jul. 27, 1993

[54] TRANSFER DEVICE FOR THE TRANSFER OF MATTER AND/OR HEAT FROM ONE MEDIUM FLOW TO ANOTHER MEDIUM FLOW

[75] Inventor: Berend P. Ter Meulen, Apeldoorn, Netherlands

[73] Assignee: Nederlandse Organisatie Voor Toegepastnatuurwetenschappelijk Onderzoek Tno, Netherlands

[21] Appl. No.: 877,161

[22] PCT Filed: Jan. 3, 1991

[86] PCT No.: PCT/NL91/00001

§ 371 Date: Jun. 25, 1992

§ 102(e) Date: Jun. 25, 1992

[87] PCT Pub. No.: WO91/09668

PCT Pub. Date: Jul. 11, 1991

[30] Foreign Application Priority Data

Jan. 3, 1990 [NL] Netherlands ............... 900014

[51] Int. Cl.⁵ .............. B01D 63/04; B01D 63/06; F28F 21/06; F28D 7/16
[52] U.S. Cl. .............. 210/321.8; 210/321.89; 210/500.23
[58] Field of Search ........... 210/321.6, 321.72, 321.78, 210/321.79, 321.8, 321.81, 321.87, 321.88, 321.89, 321.9, 500.23

[56] References Cited

U.S. PATENT DOCUMENTS 2,972,349  2/1961  Dewall.
4,054,980  10/1977  Roma.
4,622,206  11/1986  Torgeson.

FOREIGN PATENT DOCUMENTS 0291322  11/1988  European Pat. Off..
0345983  12/1989  European Pat. Off..
2178253  11/1973  France.
2236537  2/1975  France.

OTHER PUBLICATIONS

Patent Abstracts Of Japan, vol. 12, No. 117, C 487, Apr. 13, 1988.
Patent Abstracts Of Japan, vol. 10, No. 307, M527, Oct. 18, 1986.

Primary Examiner—Frank Sever
Attorney, Agent, or Firm—Bachman & LaPointe

[57] ABSTRACT

The device is made up of modules comprising a number of hollow membrane fibres or tubes which fibres or tubes are intended for being flowed through by one of the medium flows, while the other medium flows at the outside of said fibres or tubes whose ends project in a sealed manner through module parts lying opposite each other and forming part of chambers having an aperture for feeding or discharging of medium, the feed apertures and discharge apertures of adjacent modules being in register and connected to each other in a liquid-tight manner, the chambers form part of a point-symmetrical frame with a square, polygonal or circular shape and the longitudinal directions of the fibres or tubes of adjacent modules are substantially perpendicular to each other and the feed aperture and discharge aperture of each module have diametrically or diagonally opposite positions. The device can be assembled such that modules thereof are linked together located after one another or next to each other.

4 Claims, 3 Drawing Sheets

TRANSFER DEVICE FOR THE TRANSFER OF MATTER AND/OR HEAT FROM ONE MEDIUM FLOW TO ANOTHER MEDIUM FLOW

The invention relates to a transfer device for the transfer of matter and/or heat from one medium flow to another, which device is made up of modules comprising a number of hollow membrane fibres or tubes which fibres or tubes are intended for being flowed through by one of the medium flows, while the other medium flows at the outside of said fibres or tubes whose ends project in a sealed manner through module parts lying opposite each other and forming part of chambers having apertures for feeding or discharging of medium, the feed apertures and discharge apertures of adjacent modules being in register and connected to each other in a light-tight manner. Such device is known from FR 22.178.253. The invention also relates to a module for the assembly of such device.

Membrane processes and the membranes used in them were originally developed for carrying out separation on the basis of dimensions of particles or molecules (microfiltration, ultrafiltration and reverse osmosis) or for separation on the basis of solubility in and diffusion through a membrane (dialysis, gas separation, pervaporation/vapour permeation). Membrane processes have recently been developed where, unlike the above-mentioned processes, the membrane itself plays no role in the desired separation, but only causes the two phases to be kept separate. Examples of such processes are gas/gas exchange processes, gas/liquid absorption processes and liquid/liquid extraction processes. The exchanging surface between the two phases is created and maintained here by the membranes used. Since a large exchanging surface is necessary for a large matter transfer per unit volume, hollow fibre membranes are generally used in these processes.

The modules with membrane fibres of the device known from FR 2.178.253 are in fact an improvement of those designed for filtration processes. It is important here that a good matter transfer should occur at the front of the membrane (the retentate side), for example to prevent pollution or concentration polarization, the rear side of the membrane (permeate side) there is generally little or not matter transfer problem in the case of such filtration processes. In the known module for filtration processes with hollow membrane fibres these fibres are arranged in a bundle which is placed in a housing. The fibres are flowed through internally and externally in the lengthwise direction of the fibres.

These known filtration modules with hollow fibres have been treated for new matter transfer processes. In the case of such processes the matter transfer at both sides of the membrane plays an important role. It has been found that the matter transfer on the inside of the fibres is generally adequate or good, but that the matter transfer on the outside of the fibres is poor. The reason for this is that the fibres generally lie next to each other in an irregular way and at a varying distance from each other, as a result of which, on the one hand, short-circuit flows through the module are produced and, on the other, large parts of the fibres do not take part in the matter transfer process. These adverse phenomena can also occur during the use of hollow fibre membrane modules for so-called dialysis processes and in the case of gas or vapour separation processes, where at the permeate side of the membrane a so-called carrier flow is used to remove the permeate.

Using modules as known from FR 2.178.253, the surface of the membrane fibres or tubes can be flowed against well both on the inside and on the outside, while a good distribution of the medium at the outside of the membrane fibres or tubes is also possible.

However, a device according to FR 2.178.253 shows disadvantages. Such device needs to be placed into an additional housing to contain the medium flowing at the outside of the fibres or tubes of the modules. Also, the shape of the modules according to FR 2.178.253 is such that they can only be used with the fibres or tubes of adjacent modules parallel to each other, which is found out not to be the best configuration to get optimum results. Finally, there are as much discharge and feed apertures as there are rows of fibres used, involving serious sealing problems, while the fibres of different rows of one module to not communicate, resulting in moderate mixing of the fluid within the fibres, decreasing the effectiveness of the process.

The object of the invention is to remove the abovementioned disadvantages and to provide a device of the type indicate in the preamble, which can be assembled easily from modules, without the need to be placed into an additional housing, which operates effectively and which can be realized in many ways.

According to the invention, the chambers form part of a point-symmetrical frame with a square, polygonal or circular shape and the longitudinal directions of the fibres or tubes of adjacent modules are substantially perpendicular to each other and the feed aperture and discharge aperture of each module have diametrically or diagonally opposite positions.

Because the chambers form part of a frame, the device automatically forms a channel for the medium outside the fibres. Furthermore, the specific shape of the frame, together with the specific positions of the feed- and discharge apertures results in the specific relative orientation of the fibres or tubes of adjacent modules, improving the effectiveness of the device. This relative orientation of fibres or tubes of adjacent modules is known per se from FR 2.236.537, but according to this invention, such orientation of the fibres can be realized rather easy, using only one type of module, instead of at least two according to FR 2.236.537. Because the feed and discharge aperture of each module are lying diametrically or diagonally opposite each other, this type of device can easily be assembled from modules, without the need for additional connecting pipes.

The device according to the invention can advantageously be assembled from modules in two directions. For instance the modules can be linked together in such a way that they are located after one another. Then the feed and discharge aperture of adjacent modules are located at the front and rear side of the modules. Alternatively, the modules can be located next to each other, and then the feed and discharge aperture of adjacent modules are located at the sides of the module. In this way, the device can easily be designed according to desire.

The invention will now be explained in greater detail with reference to the FIGS.

Figure 1:
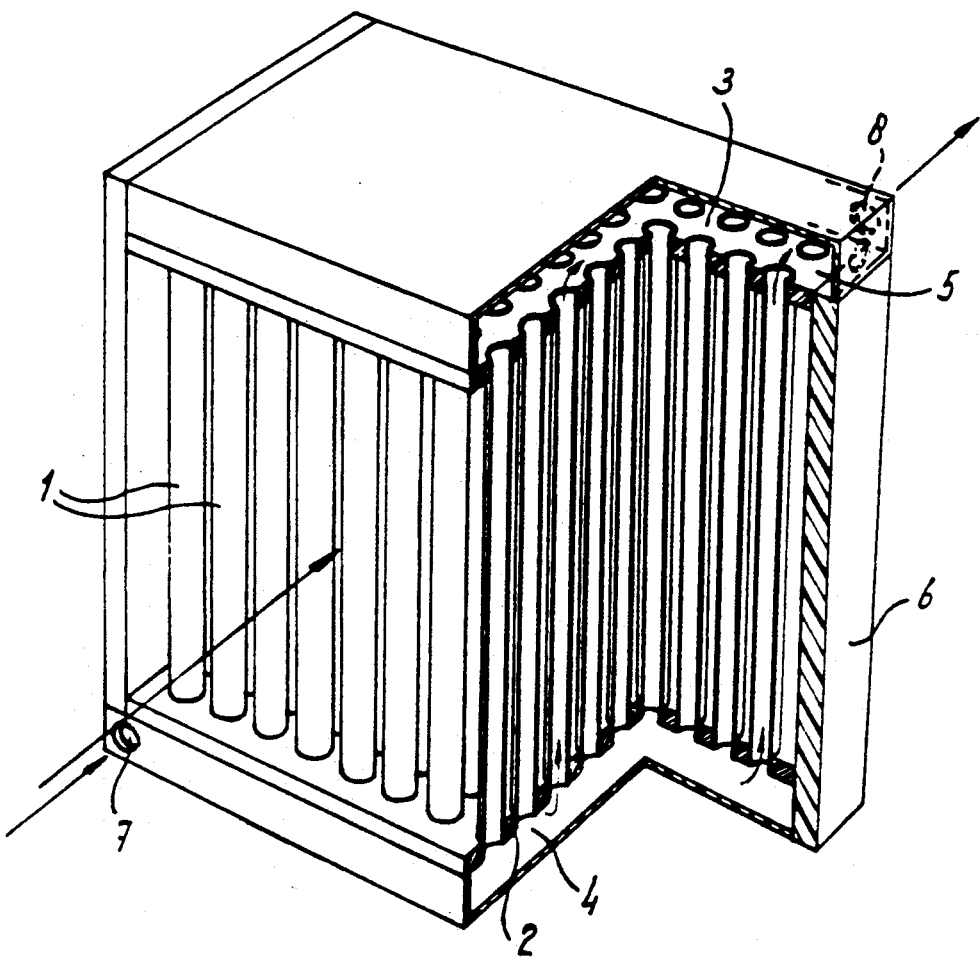
FIG. 1 shows a perspective view of a membrane module to assemble a device according to the invention, in which a part is cut away.

The membrane module shown in FIG. 1 is intended for matter transfer from a second medium flow to a first medium flow. Examples are the transfer of a micropollutant comprising a chlorinated waste substance from water (second medium flow) to an aliphatic hydrocarbon (first medium flow) and the transfer of $SO_2$ from air (second medium flow) to a sulphite solution (first medium flow).

The module comprises a large number of parallel hollow membrane fibres 1 whose ends project in a sealed manner through plates 2, 3 placed opposite each other and open into chambers 4, 5 respectively. These chambers form part of a square frame 6 which is open at two sides and closed at four sides.

The chamber 4 has a feed aperture 7 at a corner point of the frame 6, and the chamber 5 is provided with a discharge aperture 8 which is placed diagonally opposite the feed aperture 7.

During use, a first medium flow is conveyed through the aperture 7 into the chamber 4, from said chamber through the hollow membrane fibres 1 to the chamber 5, and from said chamber 5 through the aperture 8 to the next module or elsewhere. A second medium flow is in the direction of the arrows in FIG. 1, and is thus at right angles to the first medium flow in the membrane fibres. The two medium flows at right angles to each other transfer matter to each other through the membrane fibres, in other words, a component passes from one of the flows through the membranes into the other flow.

Figure 2:
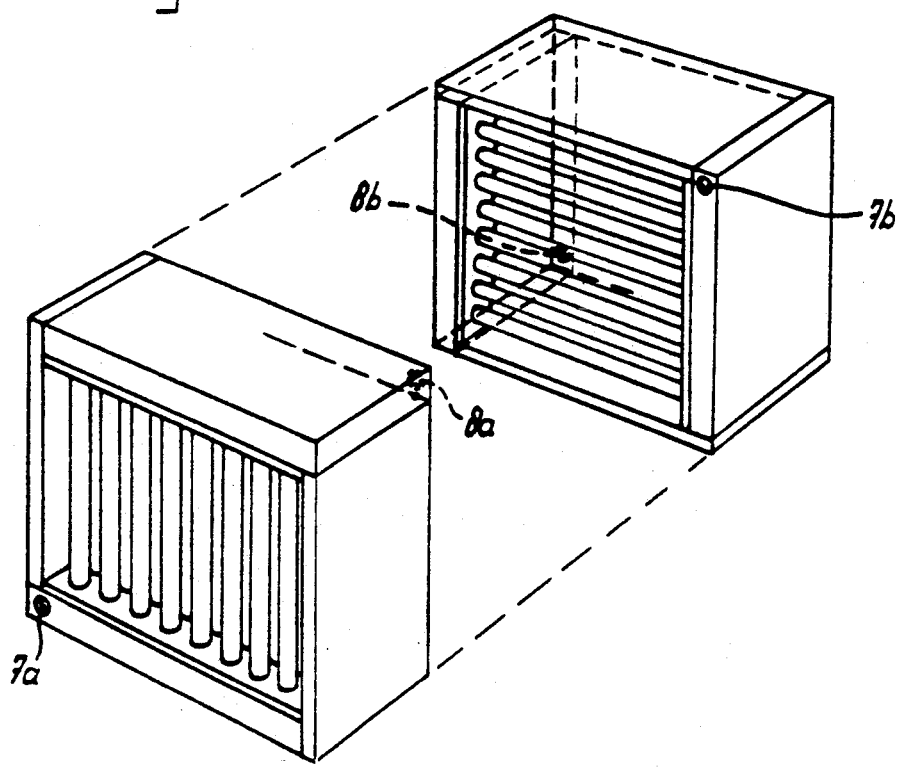
FIG. 2 shows in perspective two modules connecting to each other in a column of membrane modules, which for the sake of clarity are placed apart.
Figure 3:
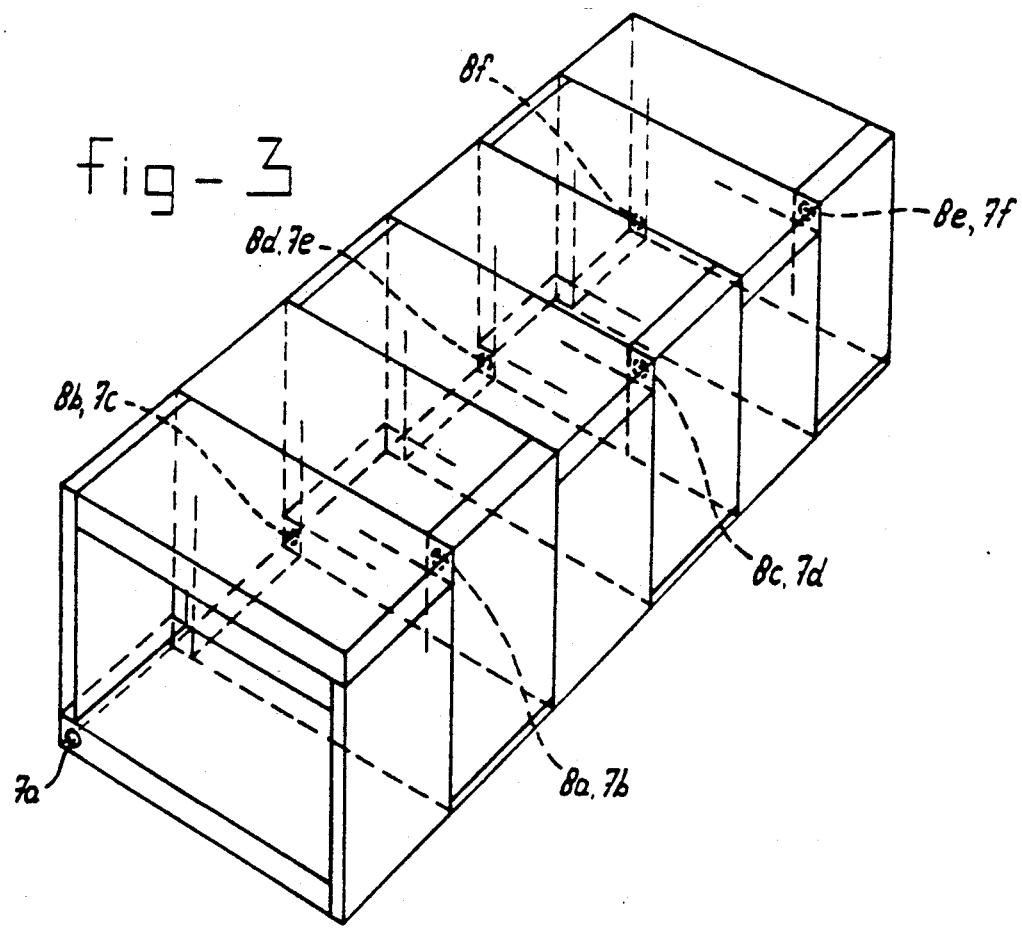
FIG. 3 shows a perspective view of a column of membrane modules according to the invention.

The membrane modules can be linked up to form a column in the manner shown in FIGS. 2 and 3, in which two successive modules are always turned through 90° relative to each other. A discharge aperture 8 in the column always lies opposite a feed aperture 7 of the next module. The medium flow to be conveyed though the membranes in the arrangement according to FIG. 3 passes in succession through the apertures 7a, 8a, 7b, 8b, 7c, 8c, 7d, 8d, 7e, 8e and 8f.

Figure 4:
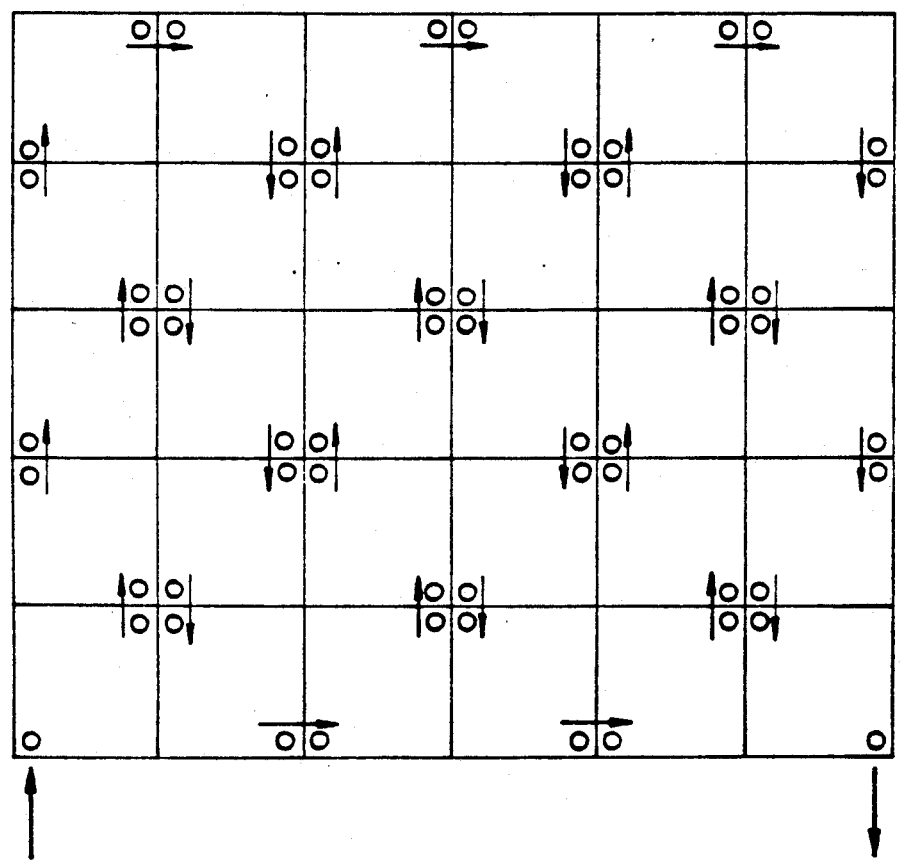
FIG. 4 shows schematically a top view of a large number of modules connecting to each other at side faces.

The schematic FIG. 4 shows how modules or module columns can be linked together in the lateral direction. The circles show feed and discharge apertures 7, 8, while arrows indicate the infeed, the transfer from one module or one column to another module or another column, and the discharge of the medium flow passing through the membranes. The other medium flow runs at right angles to the plane of the paper. The apertures 7, 8 can be provided at the front and rear side (see FIGS. 2 and 3) and/or the sides of the modules. Where modules are combined in a column, use is made of apertures at the front and rear side, and where modules are connected laterally, use is made of apertures at the sides. If a module has an aperture both at the front and rear side and at the sides, a few apertures will have to be plugged off at each junction 8-7.

FIG. 1 indicates by dotted line a possible side aperture 8.

In the modules described hollow membrane fibres or tubular membranes developed for processes such as microfiltration and ultrafiltration, reverse osmosis, dialysis and gas separation, and pervaporation/vapour permeation are used. The modules can also be used for these processes, but above all the modules are suitable for gas/gas exchange processes. gas/liquid absorption processes and liquid/liquid extraction processes. Scaling-up can be achieved by using larger modules.

A device assembled from modules described has the following advantages:

1. The membranes are flowed against in the optimum manner both at the inside and at the outside.
2. The medium flow at the outside of the membrane fibres is distributed in the optimum manner.
3. A scale enlargement is easily obtained by combining modules to form columns and adding columns in the lateral direction.
4. The frame inherently forms the channel for the medium flow outside the tubes or fibres.

It is understood out that by replacing the hollow membrane fibres of the module described by heat-conducting tubes, this module can be used for the transfer of heat from one liquid or gas flow to another liquid or gas flow.

Various modifications and variants are possible within the scope of the invention.

I claim:

1. Device for the transfer of matter and/or heat from one medium flow to another, which device is made up of modules comprising a number of hollow membrane fibres (1) or tubes which fibres or tubes are intended for being flowed through by one of the medium flows, while the other medium flows at the outside of said fibres or tubes whose ends project in a sealed manner through module parts (2,3) lying opposite each other and forming part of chambers (4,5) having an aperture for feeding or discharging of medium, the feed apertures (7) and discharge apertures (8) of adjacent modules being in register and connected to each other in a liquid-tight manner, characterized in that the chambers (4,5) form part of a point-symmetrical frame (6) with a square, polygonal or circular shape and being open at the front- and rear side to form a flow-through channel for the medium flowing outside the fibres, and that the longitudinal directions of the fibres or tubes of adjacent modules are substantially perpendicular to each other and the feed aperture (7) and discharge aperture (8) of each module have diametrically or diagonally opposite positions.

2. Device according to claim 1, characterized in that modules thereof are linked together in such a way that the front side of a frame of a module is placed against the rear side of a following module.

3. Device according to claim 1, characterized in that modules thereof are linked together in such a way that the front and rear sides thereof lie substantially in the same plane respectively.

4. Module for the assembly of a device according to claim 1, comprising a number of hollow membrane fibres (1) or tubes which fibres or tubes are intended for being flowed through by one of the medium flows, while the other medium flows at the outside of said fibres or tubes whose ends project in a sealed manner through module parts (2, 3) lying opposite each other and forming part of chambers (4, 5) having an aperture for feeding or discharging of medium, the chambers (4,5) forming part of a point-symmetrical frame (6) with a square, polygonal or circular shape, the frame (6) being open at the front- and rear side to form a flow-through channel for the medium flowing outside the fibres, and the feed aperture (7) and discharge aperture (8) of the module having diametrically or diagonally opposite positions.

* * * * *